United States Patent

Najvar et al.

[15] 3,651,649
[45] Mar. 28, 1972

[54] STABILIZATION OF SOIL WITH WATER-IN-VINYL ESTER RESIN EMULSIONS

[72] Inventors: Daniel J. Najvar, Lake Jackson, Tex.; Christ F. Parks; Garry A. Bennett; Kenneth H. Nimerick, all of Tulsa, Okla.

[73] Assignee: The Dow Chemical Company, Midland, Mich.

[22] Filed: Aug. 26, 1970

[21] Appl. No.: 66,923

[52] U.S. Cl. ............................ 61/36 R, 260/835, 260/837 R
[51] Int. Cl. ........................................ C08g 45/14, E02d 3/14
[58] Field of Search .................. 61/36; 166/295; 260/835 R, 260/837 R, 23.5 R; 161/194; 117/72

[56] References Cited

UNITED STATES PATENTS

| | | | |
|---|---|---|---|
| 3,256,226 | 6/1966 | Fekete et al. | 260/23.5 R |
| 3,286,475 | 11/1966 | Adams | 61/36 R |
| 3,301,743 | 1/1967 | Fekete et al. | 260/837 R |
| 3,367,992 | 2/1968 | Bearden | 260/837 R |
| 3,371,712 | 3/1968 | Adams | 61/36 R |
| 3,401,747 | 9/1968 | Coulter, Jr. et al. | 166/295 |
| 3,412,796 | 11/1968 | Dekking | 166/295 |
| 3,417,567 | 12/1968 | Higashimura et al. | 61/36 R |
| 3,421,584 | 1/1969 | Eilers et al. | 166/295 |
| 3,506,736 | 4/1970 | Najvar | 260/835 |

Primary Examiner—Stephen J. Novosad
Attorney—Griswold and Burdick, H. L. Aamoth and Albin R. Lindstrom

[57] ABSTRACT

Catalyzed emulsions of a water phase dispersed in a continuous phase of a polymerizable vinyl ester resin containing a copolymerizable monomer are prepared and applied to a soil or aggregate surface. The emulsion is then allowed to cure to a hard cross-linked resin having entrapped therein dispersed droplets of the water phase. The emulsions cure readily at ambient temperatures and may be formulated to cure in as short a time as a few minutes. The resulting cured emulsion-soil (or aggregate) surface is impermeable to liquids, resistant to corrosion and weathering and provides a load bearing surface.

11 Claims, 4 Drawing Figures

INVENTORS.
DANIEL J. NAJVAR
CHRIST F. PARKS
GARRY A. BENNETT
KENETH H. NIMERICK

BY H. L. Aamoth

AGENT

INVENTORS.
DANIEL J. NAJVAR
CHRIST F. PARKS
GARRY A. BENNETT
KENETH H. NIMERICK

BY  H. L. Aamoth

AGENT

STABILIZATION OF SOIL WITH WATER-IN-VINYL ESTER RESIN EMULSIONS

BACKGROUND OF THE INVENTION

This invention relates to a process for soil stabilization and the prevention of erosion, seepage of water and other liquids, and the like.

In the past, control measures against erosion, seepage, etc. were rarely applied unless the condition had reached a critical stage and frequently the control measures were not always fully effective. With the increasing emphasis on pollution control and conservation of the country's natural resources more effective methods to control such problems are more actively being sought.

To prevent erosion, seepage etc. in canals, ponds, waterways, reservoirs and the like sealants of various kinds have been utilized usually with mixed results since the sealants have not always been able to withstand the natural forces such as freeze-thaw, high run-off of water, wave action and the like as well as other forces resulting from increased population, urbanization and expanding industrialization. For example, asphaltic sealants have been utilized but their physical strength is low and must be reinforced with wire, rods, etc. The sealant must also be kept immersed otherwise it will dry out and crack or split.

In place of sealants, reinforced concrete such as Gunnite has been employed to construct irrigation ditches, run-off waterways, and to line ponds and pits. However, concrete lacks flexibility, is brittle under strain and has relatively poor corrosion resistance.

Thermoplastic and rubber sheets have been utilized to line pits and the like to prevent seepage. Problems arise in bonding or joining these sheets together and since they are usually as thin as possible it makes them readily subject to tearing, puncture or ripping due to underlying rocks or other materials and become of little value. Many of these plastic materials have a limited resistance to corrosive liquids. Another alternative is to utilize steel tanks but this is an expensive and frequently impractical approach.

A variety of other materials have been employed but they suffer from one or more disadvantages inherent in their availability, ease of application, economics, physical properties, corrosion resistance and the like.

In addition to erosion control, materials which are effective in quickly providing load bearing properties such as for construction and military purposes are desirable but not always available. Typical of such purposes are temporary roads, helicoptor landing pads (also to eliminate the dust problem) and the like.

SUMMARY OF THE INVENTION

Accordingly, this invention provides means which overcome the above problems and which are suitable for providing load bearing surfaces. It has now been discovered that a polymerizable resin, broadly defined herein as a vinyl ester resin, may be readily extended with water or other aqueous solutions to produce a water-in-resin emulsion which may be applied in a variety of ways without breaking the emulsion, such as spraying or pouring, to sand, aggregate, crushed shell, soils and the like. The emulsion cures quickly and thoroughly at ambient temperatures when catalyzed with a free radical yielding catalyst. Optionally, for the most rapid cures a polymerization accelerator may also be mixed with the emulsion.

The resin phase comprises from about 40 to 70 weight percent of a polymerizable vinyl ester resin and about 60 to 30 weight percent of a copolymerizable monomer. The emulsion is an aqueous phase dispersed in a continuous resin phase comprising from about 30 to 70 weight percent of the resin phase and about 70 to 30 weight percent of the aqueous phase.

The cured emulsion provides in combination with the substrate a permanent lining which is resistant to corrosion, weathering, burning, seepage of liquids and has good physical and load bearing properties. The vinyl ester resin phase contains at least one copolymerizable monomer and since a large portion of the weight of the emulsion consists of water or other aqueous solutions the overall economics of the process make it practical for a large number of problem soil conditions.

DRAWINGS

The invention may best be understood by reference to the following description taken in conjunction with the accompanying drawings.

DETAILED DESCRIPTION OF THE INVENTION

The process of this invention is adaptable to widely varying field conditions and provides numerous benefits and advantages. The vinyl ester resins may be readily emulsified in the field with most any source of water available at the site including brines, brackish water, cooling water effluent or other industrial water sources. The emulsions may be controlled to range from low to high viscosity for spraying and rapid penetration of the substrate or for merely pouring and spreading as a film. Simple, readily available equipment which is also portable may be used to prepare the emulsions and emplace them. After application the catalyzed emulsion cures readily at ambient temperatures of about 50° F. and above in as short a time as a few minutes up to an hour or more depending on the choice of catalyst, resin, polymerization accelerators, concentrations and the like. Importantly the cure time may be designed to allow sufficient time for penetration of the emulsion into the substrate, deaeration, mechanical leveling or grading. In most cases the emulsion coating develops 80–95 percent of its physical properties in about an hour. Peformance-wise the cured emulsion coating is essentially impermeable to water and the like even under a considerable hydrostatic head and even though the cured coating itself contains therein a high proportion of dispersed water droplets. Additionally the cured emulsion has excellent corrosion resistance to a variety of commonly encountered waters, brines and waste streams and has excellent physical properties such as flexural strength, tensile and compressive strength, heat resistance, abrasion resistance and is fire resistant.

Figure 1:
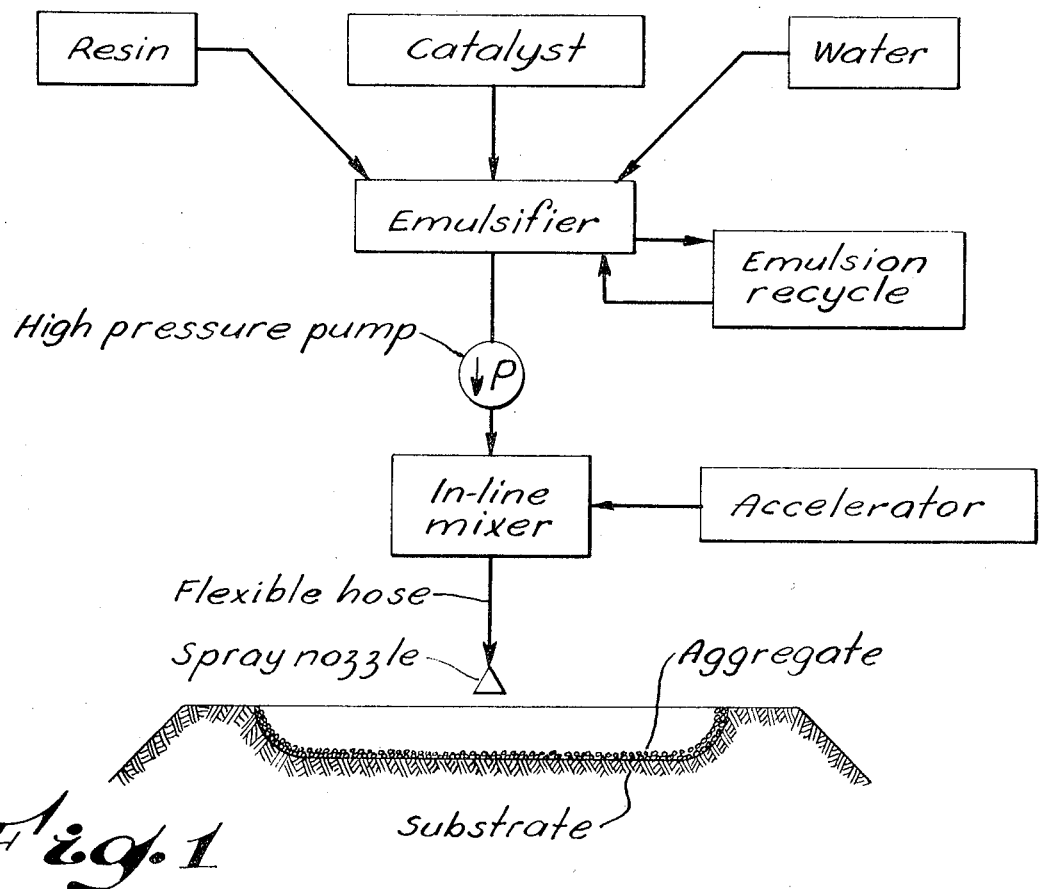
FIG. 1 is a simplified schematic drawing of the process of applying the water-in-vinyl ester resin emulsion to an aggregate covered pond surface in a continuous manner.

With reference to the drawings FIG. 1 shows a simplified schematic drawing of the process of this invention wherein the resin, catalyst and water are pumped by metering pumps into a high shear emulsifier equipped with a recycle system to allow for momentary delays in the application of the emulsion without a pressure buildup. The accessory pumps and valves etc. are not specifically shown since such equipment is both widely available in a variety of sizes and types and is well known to the skilled worker.

From the emulsifier the emulsion is pumped by means of a high pressure pump directly to a spray head or optionally as shown in FIG. 1 to an in-line mixer for the addition of an accelerator to increase the rate of polymerization. The addition of the accelerator at this point minimizes problems due to gellation of the emulsion in the equipment. In practice the equipment may also have provisions for a solvent flush (not shown in FIG. 1) to rapidly clean out the in-line mixer, pumps, lines and spray nozzle after spraying is completed.

The catalyzed emulsion is sprayed evenly over the predetermined area allowing the emulsion to penetrate the aggregate or prepared soil in the prepared area such as a diked pond schematically shown in FIG. 1. The process may be operated continuously and with portable equipment may be employed to cover large areas without stoppages or interruptions.

Figure 2:
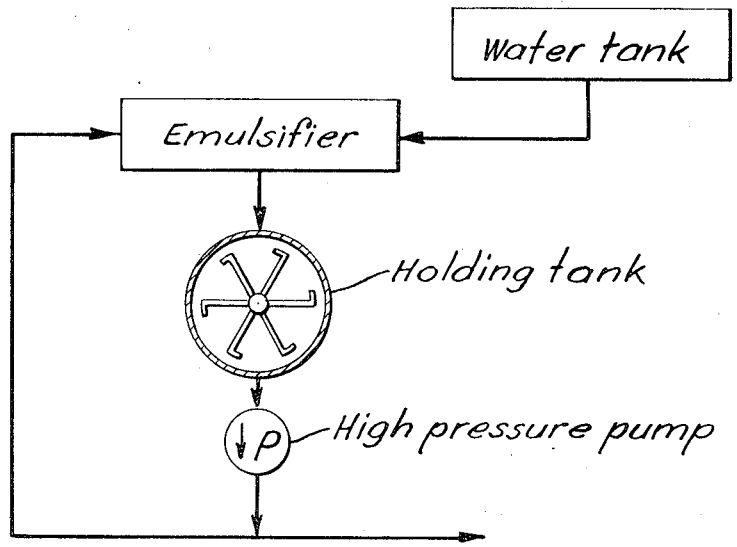
FIG. 2 is a schematic drawing of a batch-wise process employing a jet impingement emulsifier system.
Figure 3:
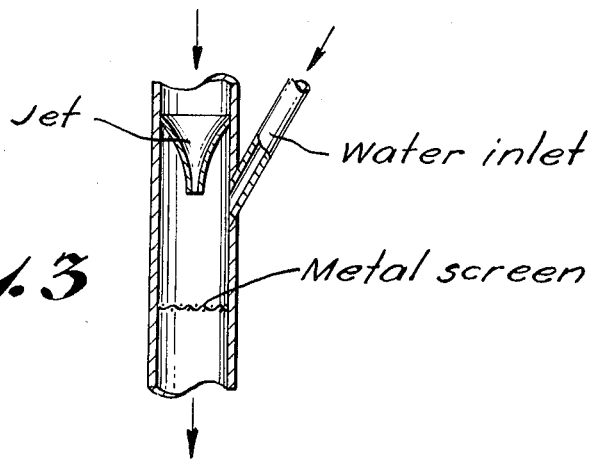
FIG. 3 is an enlarged view of the jet impingement emulsifier of FIG. 2.

A batch-wise process is shown in FIG. 2 with an enlarged view of an impingement emulsification system shown in FIG. 3. Resin is first placed in a holding tank which may have means for agitation and an equal weight of water in the water tank (enough to make a 50 percent emulsion, for example). The resin is then pumped by a high pressure pump to the emulsifier where the resin exits at high velocity from a jet and impinges on a coarse screen. The high velocity resin (and later, emulsion) stream from the jet creates a suction on the water inlet side which pulls water into the fluid resin stream. The impingement of the resin and water stream creates sufficient shear to produce a stable water-in-resin emulsion. Recirculation continues until all the water is emulsified. Catalyst may be present initially in the resin or added after the emulsion is formed. The catalyzed emulsion may then be sprayed or merely poured and spread mechanically over the substrate. An accelerator may optionally be added as in FIG. 1 if desired. While the invention is not limited to any one set of jet orifices, pump pressures etc. it has been found that a ¼ inch diameter jet operated with a pump pressure of 500 to 1,000 p.s.i. and a 10:1 volume ratio of resin (or emulsion) circulated per minute to water added per minute produces a good, stable emulsion.

Figure 4:
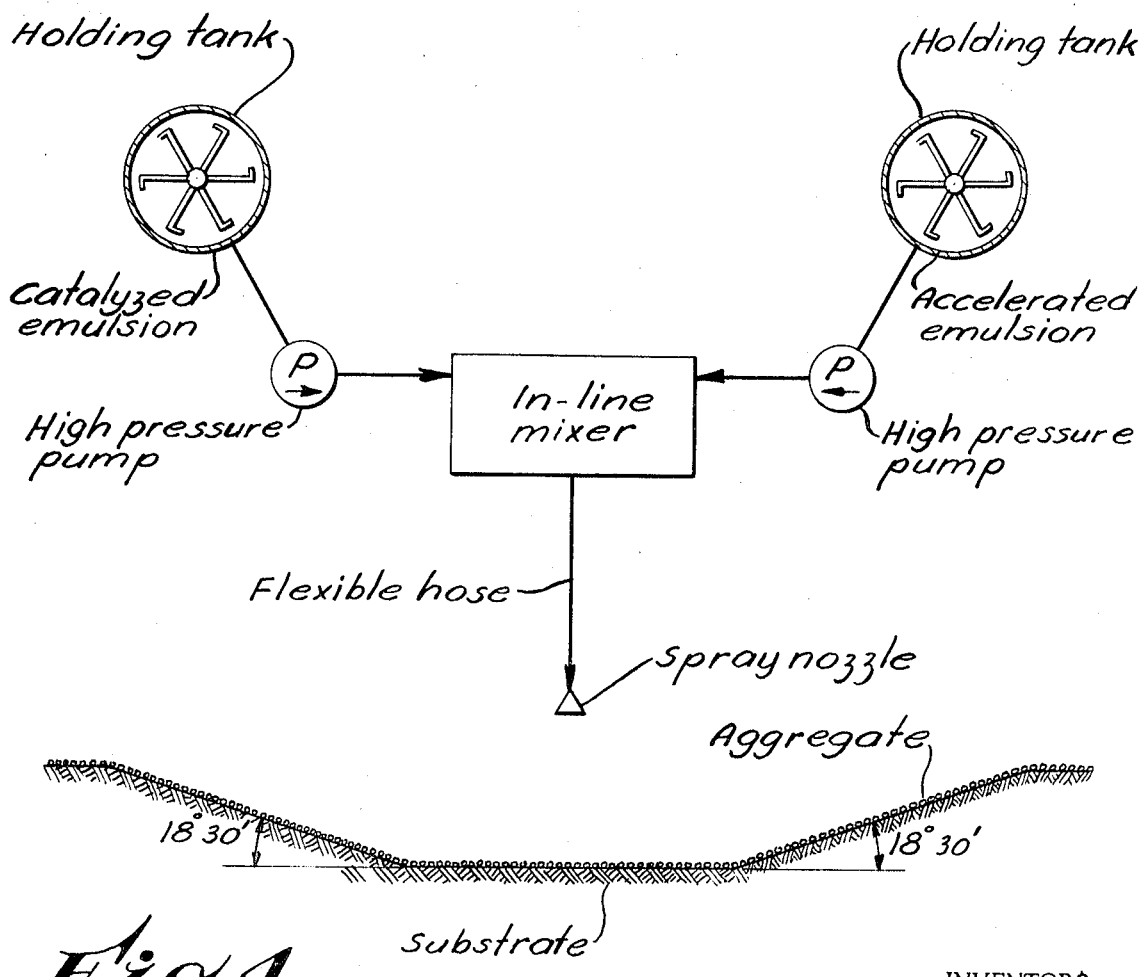
FIG. 4 is a schematic drawing of a batch-wise process wherein one part of the emulsion is catalyzed and the other part contains an accelerator and the two emulsions are combined just prior to application.

Another embodiment of the invention is shown in FIG. 4 which minimizes the gellation problem when an accelerator is employed. An emulsion containing catalyst is prepared and placed in one holding tank and another emulsion containing the accelerator is prepared and placed in another holding tank. Optionally, the holding tanks may have means for agitation and generally do. The two emulsions are then pumped to an in-line mixer and subsequently to a spray nozzle for application to a prepared surface. The substrate is shown in this instance with sides having a standard 3:1 slope (18°26′). The emulsion containing the accelerator is stable for a considerable length of time. The emulsion with catalyst has a shorter pot life but is still stable for 2–3 days at ambient (70°–90° F.) temperatures which is more than sufficient for most needs.

The invention is not limited to the specific embodiments shown in the drawings. A variety of means for the preparation of emulsions under shearing conditions are well known and commercially available to the skilled worker in addition to those specifically describe in the drawings. Equipment is also available for simultaneously applying the emulsion with sand, chopped strand glass fibers and the like to the substrate surface.

Vinyl ester resins have the valuable property of forming a stable water-in-resin (water extended resin) emulsion without an emulsifying agent and are generally prepared by the interaction of about equivalent proportions of a polyepoxide resin and an unsaturated monocarboxylic acid where

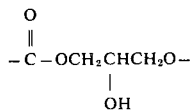

linkages are formed and the resulting resin has terminal polymerizable groups. For convenience the emulsion will be referred to herein as a water-in-resin emulsion but it is to be understood the water phase may include brines and other aqueous solutions.

Resins which are included with the definition of the term, vinyl ester resins, are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of what are defined as vinyl ester resins herein from monocarboxylic acids such as acrylic and methacrylic acid. Bowen also describes alternate methods of preparation wherein a glycidly methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin prior to reaction with acrylic acid, etc. Other difunctional compounds containing a group which is reactive with an epoxide group, such as an amine, mercaptan, and the like, may be utilized in place of the dicarboxylic acid. All of the above described resins which contain the characteristic linkages

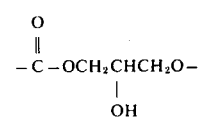

and terminal, polymerizable unsaturated groups, are classified herein as vinyl ester resins. The preparation of such resins are described in detail in said references and need not be repeated herein.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms. Said acid is generally reacted with the polyepoxide in the proportions of about 1 equivalent of acid per each equivalent of epoxide, but the proportions of equivalents may range from about 0.8/1 to 1.2/1, respectively.

Also included within the definition of vinyl ester resin herein are the modified vinyl ester resins wherein the resin, prepared as previously described, is post-reacted with a dicarboxylic acid anhydride in the proportions of about 0.1 to 0.6 moles per equivalent of hydroxyl group. As previously shown hydroxyl groups are initially formed by the interaction of a carboxyl group with an epoxide group forming the linkages characteristic of vinyl ester resins. Minor amounts of hydroxyl may also be present from higher molecular weight polyepoxides employed in making the resin. The post reaction of the anhydride introduces a plurality of pendant carboxyl (—COOH) groups by the formation of a half ester between the hydroxyl and the anhydride group. A reaction temperature of about 25° to 150° C. is suitable but about 80° to 120° C. are usually preferred. Suitable polymerization inhibitors may also be added.

Both saturated and unsaturated anhydrides are useful in said post reaction. Suitable dicarboxylic acid anhydrides containing ethylenic unsaturation include maleic anhydride, the halogenated maleic anhydrides, citraconic anhydride, itaconic anhydride and the like and mixtures thereof. Saturated dicarboxylic acid anhydrides include phthalic anhydride, tetrabromophthalic anhydride, chlorendic anhydride, anhydrides of aliphatic unsaturated dicarboxylic acid and the like.

The vinyl ester resin is admixed (diluted) with a copolymerizable monomer and may contain from about 30 to 60 percent by weight of the total mixture of said monomer and correspondingly from about 40 to 70 percent by weight of said vinyl ester resin. Suitable monomers must be essentially water insoluble to maintain the monomer in the resin phase in the emulsion, although complete water insolubility is not required and a small amount of monomer dissolved in the emulsified water does no harm. The proportions of monomer are critical in that a resin phase which contains less than about 30 percent monomer or more than 60 percent monomer will not normally form stable emulsions containing about 50 percent or more water.

Suitable monomers include vinyl aromatic compounds such as styrene, vinyl toluene, halogenated styrenes, divinyl benzene and the like; saturated alcohols such as methyl, ethyl, isopropyl, octyl, etc. esters of acrylic acid or methacrylic acid; vinyl acetate, diallyl, maleate, dimethallyl fumarate; mixtures of the same and other monomers which are capable of copolymerizing with the vinyl ester resin and are essentially water insoluble.

The vinyl ester resins may also be mixed with unsaturated polyester resins within certain proportions and obtain the benefits of this invention. Said polyester may be mixed with said vinyl esters in weight ratios up to 2:3, respectively. Such a resin mixture may be prepared by physically mixing said resins in the desired proportions or alternately by preparing said vinyl ester resin in the presence of said polyester according to the procedure described in an application of D. J. Najvar, Ser. No. 600,788 filed on Dec. 12, 1966, now U.S. Pat. No. 3,506,736.

Briefly, a wide variety of unsaturated polyesters which are readily available or can be prepared by methods well known to the art may be utilized in the preparation of the vinyl ester/unsaturated polyester resin compositions of this invention. Generally, in the preparation of suitable polyesters, an ethylenically unsaturated dicarboxylic acid such as maleic acid, fumaric acid, itaconic acid or the like is interesterified with an alkylene glycol or polyalkylene glycol having a molecular weight of up to 2,000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed with a molar range of 0.25 to as much as 15 moles per mole of the unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 1 to 5 hours.

Polymerization inhibitors such as t-butyl catechol may be advantageously added. It is also possible to prepare unsaturated polyesters directly from the appropriate oxide rather than the glycol, e.g., propylene oxide may be used in place of propylene glycol. The condensation (polymerization) reaction is continued until the acid content drops to about 2 to 12 percent (—COOH) and preferably from 4 to 8 percent.

In the practice of this invention emulsions of a water phase dispersed in a resin phase may be prepared in a variety of ways. Generally a free radical yielding catalyst is blended with the resin phase and then the water is admixed with the catalyzed resin phase under shearing conditions to form a water-in-resin emulsion. Preferably the water is slowly added to the resin phase. While the shear conditions may vary widely, generally sufficient shear should be applied to produce a uniform emulsion of small particle size. Preferably the dispersed water droplet is less than about 1 micron in diameter.

The proportions of water are also critical in that emulsions with less than about 30 percent water are generally unstable due to the low viscosity of the emulsion. Water levels above about 70 percent detract from the physical properties of the cured article to be generally useful. Accordingly the water extended vinyl ester resin compositions (water-in-resin emulsions) are prepared to contain from about 30 to 70 percent by weight of an aqueous phase with the balance comprising the resin phase. Preferably the emulsion contains water in the range of about 50 percent by weight.

Emulsion viscosity may be varied by the amount of the water in the emulsion and by the resin phase. Generally increasing amounts of water increase the viscosity. Viscosity is also dependent, at least to some degree, on the molecular weights of the resin and on the extent of dilution of same with a copolymerizable monomer.

In addition to water, aqueous solutions of many kinds may be used. Salty water ranging from sea water to brackish water to various brines may also be used and offer particular advantages in some instances. Water containing small amounts of acids may also be used but high concentrations should be avoided since they tend to inactivate the catalyst and accelerators. Water containing various amounts of soluble or dispersible salts is generally acceptable.

Vinyl polymerization catalysts that may be used for the curing or polymerization include the peroxide catalysts such as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of the resin phase. The choice of a catalyst influences the speed of cure which may range from an hour or more up to a day or two if desired. Preferably, for fast cures benzoyl peroxide may be used.

Advantageously, for rapid curing, accelerating agents may be added to the emulsion, preferably just prior to application to the aggregate or soil surface since accelerated emulsions may gel in a matter of minutes. Useful accelerators include lead or cobalt naphthanate, N,N-dimethyl p-toluidine, cobalt octoate, N,N-dimethyl aniline or the like with dimethyl aniline preferred. Accelerated emulsions may be cured in as short a time as about 3 to 30 minutes depending on catalyst level, temperature, accelerator concentration and the like. Curing temperatures normally range from about 50° to 140° F. although higher temperatures are useful if external heating equipment is available.

The process of this invention may be employed to stabilize a variety of soils and aggregate materials to prevent erosion, seepage, etc. Soils generally contain a variety of siliceous and other inorganic materials such as silica (sand), clays, calcium and magnesium carbonates, other insoluble inorganics and the like. The organic matter usually present with most soils does not present a problem. Aggregates include sand, gravel, various insoluble inorganics, crushed shell (e.g., oyster shells) and the like. Very finely divided carbonates and sulfates above about 5–10 weight percent in the emulsion may cause the emulsion to invert and should not be mixed directly with the emulsion. However, the emulsion may be applied directly to such a surface since there is little penetration into such finely divided materials that a cured coating may be obtained with the resulting benefits of this invention.

The following non-limiting examples will further illustrate the invention. All parts and percentages are by weight unless otherwise specified.

Example 1

A vinyl ester resin was prepared by reacting about 2 equivalents of methacrylic acid with 1 equivalent of a glycidyl polyether of bisphenol A having an epoxide equivalent weight of 475–575 (DER 661) and 1 equivalent of a glycidyl polyether of bisphenol A having an epoxide equivalent weight of 185–192 (DER 331). DMP-30 (tris(dimethylaminomethyl)phenol) was added as a catalyst and the reactants were heated at about 100° C. until the acid content fell below about 1–2 percent. The reaction was inhibited against polymerization by the presence of about 110 p.p.m. of hydroquinone.

The vinyl ester resin prepared above was then modified by further reaction with about 2.5 percent of maleic anhydride by heating for about 2 hours at about 100° C. After cooling the resin was diluted to contain about 45 percent styrene and 55 percent resin.

Four emulsions were prepared from the above modified vinyl ester resin at 40, 50, 55 and 60 percent water. The emulsions were catalyzed with 0.5 percent benzoyl peroxide, percent by weight of resin content, and accelerated (promoted) with 0.2 percent dimethyl aniline and ⅛ inch castings made and cured at 80° C. for 16 hours. The physical properties of these castings were then determined. It is to be noted that most of the physical properties exceed those for Class A concrete.

CURED PHYSICAL PROPERTIES OF WATER-IN-VINYL ESTER RESIN EMULSIONS

| Property | Wt. % Water | | | |
|---|---|---|---|---|
| | 40 | 50 | 55 | 60 |
| Flex Strength, p.s.i. | 5,200 | 4,610 | 4,020 | 3,560 |
| Flex Modulus, p.s.i. × 10⁵ | 2.3 | 1.79 | 1.16 | 1.07 |
| Tensile Strength, p.s.i. | | | | |
| 0° F. | — | 2,500 | — | — |
| 75° F. | 3,400 | 2,400 | 1,880 | 1,410 |
| 180° F. | — | 118 | — | — |
| Yield Strength, p.s.i. | 4,810 | 3,530 | 3,830 | 2,300 |
| Compressive Strength, p.s.i. | 7,230 | 5,446 | 3,540 | 2,650 |
| 264 p.s.i., Heat Dist. Temp. °F. | 185 | 183 | 177 | 167 |
| Emulsion viscosity, c.p.s. | 3,100 | 5,200 | 7,600 | 9,700 |
| Density, lb./ft.³ | 64.5 | 64 | 63.5 | 63 |

The effect of water content on the viscosity of the emulsion is also to be noted. Generally a water level of about 50 percent is preferred.

Example 2

To illustrate the process of the invention an emulsion was prepared with a modified vinyl ester resin containing styrene similar to Example 1 by adding benzoyl peroxide catalyst to the resin and with high speed, high shear stirring water was added slowly to effect a smooth, creamy white water-in-resin emulsion. A small amount of a 4 percent paraffin wax solution in styrene was added to the resin prior to its application. The final emulsion contained the following proportions.

| vinyl ester resin | 15 lb. |
|---|---|
| Benzoyl peroxide (powder) | 100 g. |
| Water (Tap) | 15 lb. |
| 4% wax solution in styrene | 200 g. |
| N,N-dimethyl aniline | 26 ml. |

The accelerated emulsion was then sprayed over crushed shell, rocks, soil and even bits of growing grass in a drainage ditch by means of a Grayco Hydra-Spray pump, employing a 20:1 air compression ratio. The emulsion was stable after spraying and cured in 25–30 minutes into a thin 1/16 inch coating to provide a waterproof barrier. After 1 year of service the film is still continuous and smooth. A similar emulsion was applied to a test plot, 3 feet × 9 feet in dimension, which was subject to automotive traffic. After about 20 months of traffic the test plot showed no signs of breaking or cracking or apparent loss of its strength.

Example 3

Since the emulsion may be either sprayed on top of the surface or mixed with the surface material, tests were made to evaluate the properties of the cured emulsion with and without sand and also to evaluate the use of a brine in place of the water.

For this purpose a vinyl ester resin was prepared in a manner similar to Example 1 from 9.5 parts of methacrylic acid, 10.5 parts of DER 331, 30.0 parts of DER 661 with about 700 p.p.m. of DMP-30 catalyst and about 100 p.p.m. of hydroquinone. About 1 part of maleic anhydride was post reacted with the resin before dilution with styrene to contain 50 percent styrene.

Four types of cured emulsions were prepared with the above resin: (A) a water-in-resin emulsion; (B) the A emulsion mixed with 8–12 mesh sand; (C) a brine-in-resin emulsion; and (D) the C emulsion mixed with said sand. All the emulsions were prepared to contain 50 percent resin phase and 50 percent aqueous phase. The sand-emulsion mixtures were prepared with about 1.5 pore volumes of resin for a given weight of sand. All the emulsions were catalyzed with 0.2 gms. of benzoyl peroxide per 100 ml. of emulsion and 0.1 percent (by volume) of N,N-dimethyl aniline promotor. The brine used was a standard API brine containing 2.5 percent NaCl and 8 percent $CaCl_2$.

Test specimens were cast as 2 inches × 2 inches × 2 inches cubes and figure-eight briquets for testing of compression and tensile strengths and dimensional stability under exposure to outside ambient conditions (60° to 110° F.) and to the same conditions with the test specimens immersed in an API standard brine. Compression tests were run similar to ASTM Test Methods C 109-58 and D 695-54 using a Tinius Olsen hydraulic test instrument loaded at a constant crosshead motion of about 0.2 inches per minute. Tensile tests were run according to ASTM Test Method C 190-58 with a modified Tinius Olsen instrument.

Compression and Tensile Strength Aging Tests

| Type of Cured Emulsion | Exposure | Days | Strength, p.s.i. | |
|---|---|---|---|---|
| | | | Comp. | Tensile |
| A | air | 1 | 3,161 | 931 |
| A | air | 24 | 2,975 | 881 |
| A | air | 109 | 2,773 | 1,050 |
| A | brine | 1 | 3,227 | 934 |
| A | brine | 24 | 3,156 | 908 |
| A | brine | 109 | 2,943 | 989 |
| B | air | 1 | 1,940 | 272 |
| B | air | 27 | 1,840 | 259* |
| B | air | 104 | 2,383 | 219 |
| B | brine | 1 | 1,901 | 276 |
| B | brine | 27 | 1,594 | 235* |
| B | brine | 104 | 1,622 | 212 |
| C | air | 1 | 2,583 | 981 |
| C | air | 39 | 3,651 | 1,198 |
| C | air | 100 | 3,919 | 1,251 |
| C | brine | 1 | 2,962 | 1,023 |
| C | brine | 39 | 3,645 | 950** |
| C | brine | 100 | 2,875 | 1,317 |
| D | air | 1 | 1,979 | 186 |
| D | air | 39 | 3,213 | 334 |
| D | air | 100 | 1,803 | 132 |
| D | brine | 1 | 1,868 | 228 |
| D | brine | 39 | 2,806 | 358 |
| D | brine | 100 | 1,927 | 113 |

* After 19 days
** After 40 days

In general the results show a slight decrease in compression and tensile strengths of about 10 to 15 percent. In some instances the strengths increased, for example the C emulsions. While only part of the results are tabulated the results with the D emulsions were quite erratic due to insufficient deaeration of the emulsion before preparation of the test specimens. All other emulsions were adequately deaerated prior to use.

None of the above test specimens exhibited any cracking although some 9 inch × 12 inch × ¼ inch castings showed a slight upward curvature at the corners. Other tests with specimens of different contours, etc. prepared from the B emulsions also showed no signs of cracking under moderately severe conditions of tensile stress, indicating good strength.

The test specimens were also examined for dimensional stability under the aging conditions with only a slight decrease of up to 7 percent in volume (1.8 percent linear change) noted. The use of aggregate (i.e., sand in this case) appears to enhance the dimensional stability.

Example 4

Cured specimens prepared from the A and B emulsions of the previous example were also tested for permeability. The tests were made on a 1 inch × 1 inch core sample with a low pressure permeator wherein water under 120–150 lbs. pressure is applied to the bottom of the core for at least 20 minutes. If the top of the core is still dry, water under 120 lbs. pressure is applied as before for an additional 1 to 2 hours. If the surface is still dry the permeability is classified as "none" or "not detectable." A wet top surface is called "detectable."

After 70 days no detectable permeability was found with either the A or B cured emulsions which were aged in brine. It can be calculated that the maximum permeability of said cores is only 0.00116 millidarcy. Another test with air as the permeable fluid in place of water using a Hassler-type permeator at a differential air pressure of 900 p.s.i.g. passed less than 1 ml. of air in 3 hours which calculates to be a maximum permeability of $1.38 \times 10^{-6}$ millidarcy.

Example 5

Chemical exposure tests were made with cured specimens of the A and B emulsions described in Example 3 for 190 days against various strengths of sulfuric, nitric, hydrochloric and acetic acids; NaOH and ammonium hydroxide solutions; kerosene and toluene; $CaCl_2$-$MgCl_2$ brines and $FeCl_3$ brines; an acidic, bacterially active leach fluid from a copper leaching solution; and against a low and high gravity crude oil for 104 days. Only toluene showed any effect on the specimens, causing swelling in a few hours.

Example 6

Another important factor is freeze-thaw stability. Two inch cubes were prepared from the previous A, B and D emulsion and one similar to the C emulsion varying only in that the brine used contained 35 percent $CaCl_2$. A freeze-thaw cycle consisted of exposing the cube to a 5° F. temperature for 24 hours, followed by 24 hours at 140° F. After testing the cubes for eight cycles it was concluded that the cured emulsions are not adversely affected by alternate freezing and thawing since, importantly, none of the test specimens developed permeability and in addition compressive strengths remained high and no cracks developed on any smooth surface.

Example 7

To illustrate the process of FIG. 3 a resin similar to that of Example 3 was emulsified with an equal weight of water and placed in two separate holding tanks. The emulsion in one holding tank was catalyzed by the addition of 1.6 percent benzoyl peroxide paste on the weight of resin (said peroxide 50 percent active) and 0.4 percent N,N-dimethyl aniline (by volume of resin) was added to the other emulsion. After the additives were thoroughly blended the emulsions were ready for mixing and spraying.

A small pond was covered with about one-half inch to 1 inch of a 6 to 20 mesh sand. The previous emulsions were then pumped in a 1:1 volume ratio to a common line, through an in-line mixer and through a spray nozzle onto the pond substrate. Typically, with a 65° Vee-jet No. 65–70 nozzle (Spraying Systems Inc.) about 12 gallons per minute of the mixed, catalyzed and accelerated, emulsion was sprayed on the sand substrate under 80 lbs. pressure. It was found that the mixed emulsion penetrated the sand substrate about one-fourth to three-fourths inch. After curing at ambient temperatures a small area was found to have a poor surface which appeared to result from irregularities in covering the sand or in spray technique. Initially the pond, when filled with water, leaked in this area but after 6 weeks the pond was maintaining a water level 1 foot above the suspect area.

Example 8

The cured emulsion surface may be readily patched. Holes were deliberately made in a cured emulsion-aggregate surface similar to that of Example 7. A similar emulsion containing the same amount of catalyst and accelerator was prepared and then mixed with a sufficient amount of sand to make a stiff slurry. The surface area around each hole was cleaned with methyl ethyl ketone and the stiff slurry was packed into each of the holes and onto the surrounding surface and smoothed. After 6 weeks the patches appear to be sound.

Example 9

In addition to the resins of the previous examples the following resins were also found to give similar results.

A. A mixture of 33.2 parts of D.E.R. 331 polyepoxide resin was mixed with 6.9 parts of bisphenol A and heated to 150° C. for 1 hour to produce a higher molecular weight polyepoxide resin. Ethyltriphenyl phosphonium iodide was present as a catalyst for this reaction. The mixture was cooled to 120° C. and 9.7 parts of methacrylic acid added and the reaction continued until the acid content was about 1 to 1.4 percent (as —COOH). Then 50 parts of styrene monomer was added to give a resin containing about 50 percent styrene.

B. A resin similar to A was made from the following reactants 32.1 pts D.E.R. 331
4.7 pts polyepoxide based on a polyglycol having an epoxide equivalent weight of 305–335 (D.E.R. 732)
3.2 pts bisphenol A
13.5 pts methacrylic acid
45.0 pts styrene C. A resin was made similar to Example 3 from the following reactants 16.9 pts D.E.R. 331
16.9 pts D.E.R. 438 (an epoxy novolac having an epoxide equivalent weight of 175–812)
15.2 pts methacrylic acid
1.0 pts maleic anhydride
50.0 pts styrene The reaction of the polyepoxides with methacrylic acid was carried to about a 1.2 to 1.5 percent —COOH content and the post reaction with maleic anhydride continued until the acid content was about 1–1.4 percent.

The above three resins have the advantage of producing emulsions at 50 percent water content which have lower viscosities of about 1,500 cps. or below and which are easier to apply by spraying on a substrate.

It will be understood that the present invention is not limited to the specific materials, steps and other details described above but may embody various modification insofar as they are defined in the following claims.

What is claimed is:

1. A process for stabilizing soil and aggregate surfaces which comprises
a. preparing a catalyzed emulsion of an aqueous phase dispersed in a resin phase wherein the emulsion comprises from about 30 to 70 weight percent of the aqueous phase and about 70 to 30 weight percent of the resin phase, wherein said resin phase comprises from about 40 to 70 weight percent of a vinyl ester resin characterized in having

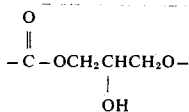

linkages and terminal unsaturated polymerizable groups and from about 60 to 30 weight percent of at least one copolymerizable essentially water insoluble monomer and wherein said emulsion contains a catalytic amount of a vinyl polymerization catalyst;

b. applying said emulsion to said surfaces in an amount sufficient, when cured, to stabilize the surface; and c. allowing said emulsion to cure.

2. The process of claim 1 wherein said vinyl ester resin is a product of the reaction of about 0.8 to 1.2 equivalents of an unsaturated monocarboxylic acid per equivalent of an epoxide resin having more than one epoxide group per molecule.

3. The process of claim 2 wherein said acid is acrylic acid or methacrylic acid.

4. The process of claim 2 wherein said epoxide resin is an epoxy novolac, a polyglycidyl ether of a polyhydric phenol, a polyglycidyl ether of a polyhydric alcohol or mixtures thereof.

5. The process of claim 2 wherein said vinyl ester resin is reacted with about 0.1 to 0.6 moles of a cyclic anhydride per equivalent of hydroxyl group.

6. The process of claim 5 wherein said anhydride is maleic anhydride.

7. The process of claim 1 wherein the vinyl ester resin of said resin phase is partially replaced by an unsaturated polyester resin in the proportions of up to about 2 parts of said polyester per 3 parts of said vinyl ester.

8. The process of claim 1 further comprising the addition of a polymerization accelerator to said emulsion.

9. The process of claim 1 further comprising mixing the emulsion with said soil or aggregate prior to application to a substrate surface.

10. The process of claim 1 wherein said aqueous phase contains an inorganic salt dissolved therein.

11. A process for stabilizing soil and aggregate surfaces which comprises a. preparing a first emulsion of a water phase dispersed in a resin phase wherein the emulsion comprises from about 30 to 70 weight percent of the water phase and about 70 to 30 weight percent of the resin phase, wherein said resin phase comprises from about 40 to 70 weight percent of a vinyl ester resin characterized in having

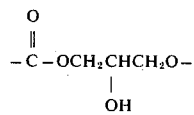

linkages and terminal unsaturated polymerizable groups and from about 60 to 30 weight percent of at least one copolymerizable monomer and wherein said emulsion contains a catalytic amount of a vinyl polymerization catalyst;

b. preparing a second emulsion having the same proportions of said water phase and said resin phase wherein said resin phase is as defined in (a) above and wherein the second emulsion contains an effective amount of a polymerization accelerator;

c. mixing said first emulsion with said second emulsion;

d. applying the emulsion mixture of step c. to said surface in an amount sufficient, when cured, to stabilize the surface; and e. allowing said emulsion mixture to cure.

* * * * *